United States Patent [19]

Murai

[11] Patent Number: 4,952,044
[45] Date of Patent: Aug. 28, 1990

[54] METALLIC EYEGLASS FRAME AND METHOD OF MAKING THE SAME

[75] Inventor: Masaru Murai, Fukui, Japan

[73] Assignee: Sigma Industry Co., Ltd., Fukue, Japan

[21] Appl. No.: 344,470

[22] Filed: Jun. 12, 1989

Related U.S. Application Data

[63] Continuation of Ser. No. 39,430, Apr. 17, 1987, abandoned.

[51] Int. Cl.⁵ ............................................. G02C 13/00
[52] U.S. Cl. ..................................................... 351/41
[58] Field of Search ................. 351/41, 122, 139, 129, 351/117

[56] References Cited

U.S. PATENT DOCUMENTS

| | | |
|---|---|---|
| 4,472,035 | 9/1984 | Takamura et al. .................... 351/41 |
| 4,494,831 | 1/1985 | Yaguchi et al. ........................ 351/41 |
| 4,494,832 | 1/1985 | Takamura et al. .................... 351/41 |

*Primary Examiner*—Paul M. Dzierzynski
*Attorney, Agent, or Firm*—Birch, Stewart, Kolasch & Birch

[57] ABSTRACT

An eyeglass frame of the type having at least a member made from the Ni-Ti base alloy with a shape-memory effect, the member being joined with another member by soldering. The Ni-Ti base alloy member has a portion previously coated by a Ni or Ni-alloy plating of 3 to 50 micron thickness and then joined to the other member by soldering to increase the adhesive strength between the portions soldered to a desired extent.

2 Claims, 1 Drawing Sheet

4,952,044

METALLIC EYEGLASS FRAME AND METHOD OF MAKING THE SAME

This application is a continuation of application Ser. No. 07/039-430 filed on Apr. 17, 1987, now abandoned.

BACKGROUND OF THE INVENTION

The present invention relates to a metallic eyeglass frame of the type having a shape-memory effect and a method of the making the same.

In general, an eyeglass frame is composed of several members, such as an eyeglass rim, a bridge, and a temple. A pair of eyeglass rims are connected to each other by the intervention of one or more bridges. The bridge is provided at the both ends with a couple of pad-holders each holding a pad. Each rim is provided at its outside with a rim lock connected to a temple by the use of a hinge and a screw. The members are made of many sorts of materials, such as metal and plastics. Above all, metallic eyeglass frames are most popular because of being superior in use, easy for design and fashionable in appearance. The conventional members have been made from metallic materials containing one or more of Cu-Ni-Zn alloy(nickel silver), Ni-Cr alloy, titan and/or stainless steel.

Recently, a superelastic Ni-Ti base alloy has been proposed as a metallic material for use in fabricating the member of an eyeglass frame because of being elastically formable to a remarkable extent in comparison with the conventional metallic material. Therefore, it is expected that the Ni-Ti base alloy, if used as a material to form an eyeglass frame, may improve such properties of the frame as shape-keeping, recovery from deformation, and mutual connection between the members and fitness to the user's face.

However, the Ni-Ti base alloy is relatively poor in machinability, so that it should be limited to a member that is simple in shape and necessary for it to have a shape-memory effect and the other members rather than being made from the usual metallic material. This means that the Ni-Ti base alloy member is always bonded to the other member. The bonded portion in the eyeglass frame is required to have a high tensile strength as well as a shearing strength more than 15 kg/sq.mm because of subjection to tension, torsion and peeling. The shearing strength more than 15 kg/sq.mm can be obtained if the same Ni-Ti base alloy members are joined with each other by spot-welding. But, the spot-welding is unavailable for joining the tiny members of the eyeglass frame. The spot-welding apparatus is too large to be used for joining the members. Besides, the spot-welding can not be achieved without a spot of welding remaining which surely causes damage in appearance of the frame. The Ni-Ti base alloy member is joined with the other member by soldering. However, no strong bonding is obtained by soldering between two members of which either contains the Ni-Ti base alloy. The reason for this is that solder is not easy to flow over nor solid-solved in the intermetallic compound of the Ni-Ti alloy even if soldering is made under the atmosphere of argon gas. The soldered portion no more than connects the Ni-Ti base alloy member with the other member, having a strength much less than 15 kg/sq.mm.

SUMMARY OF THE INVENTION

It has been found that the Ni-Ti base alloy member is firmly soldered to the same or other metal member when previously plated by Ni or Ni-alloy and then soldered by the use of the Ag-solder as usually used in soldering of Cu-Ni-Zn or Ni-Cr alloys. After many trials to improve the strength of the bonded portion by soldering between two members of an eyeglass frame, at least one containing the Ni-Ti base alloy, the present invention has been contrived. It consists of an eyeglass frame comprising at least a member made from the superelastic Ni-Ti base alloy and the member being previously coated by Ni or Ni-alloy plating of 3 to 50 micron meters thickness and then bonded by soldering to another member made from the same Ti-Ni base alloy or other metal.

One object of the present invention is to provide an eyeglass frame of the type having at least the Ni-Ti base alloy member firmly joined with the other member.

Another object of the invention is to provide an eyeglass frame of which the original shape is easily conservable and perfectly recoverable from deformation.

A further object of the invention is to provide an eyeglass frame improved in fitness to the user's face.

A still further object of the invention is to provide a method of making an eyeglass frame of the type having at least the Ni-Ti base alloy member firmly soldered to the other member.

Other objects and features of the invention will be apparent from the following description of the invention with reference to the accompanying drawings.

DETAILED EXPLANATION OF THE INVENTION

Figure 1:
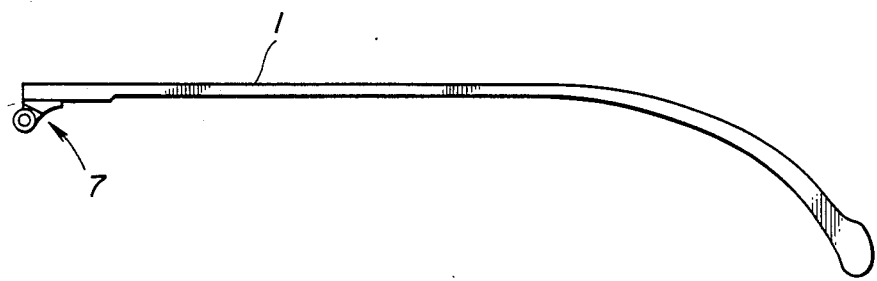
FIG. 1 is a side elevation of the temple of the present invention.

According to the invention, the eyeglass frame is fabricated from the Ni-Ti base alloy such as alloys composed substantially of the Ni-Ti intermetallic compound and alloys composed of Ni-Ti-Fe, Ni-Ti-Cr, and/or Ni-Ti-Cu compound derived by replacing Ni or Ti of the Ni-Ti compound partly by Fe, Cr, or Cu. The Ni-Ti base alloy can be shaped into any member, that is, a temple, an eyeglass rim, a bridge, a pad-holder, a pad, a rim lock and a hinge by the known process of plastic working, heat-treatment and machining. The shaped member is fully or partly coated by Ni or Ni-alloy plating, the portion to be joined always being fully plated. The plating metal is either pure Ni or one of the Ni-alloys such as Ni-P alloy and Ni-Pd alloy. The thickness of the plating is within a range of 3 to 50 micron meters, the portion to be joined by soldering desirably being coated by 3 to 50 microns thickness plating and the other portion by 5 to 50 microns thickness plating. If the portion to be soldered were coated by a less than 3 microns thickness plating, the Ni-Ti base alloy would form a diffusion layer with the solder component substances so as to reduce the bonding strength. The other portion is desirably coated with the plating of 5 to 50 microns thickness, because of being peeled by 1 to 2 microns thickness by grinding both prior to being soldered and to being finished. On the other hand, if the plating thickness is more than 50 microns, the Ni-Ti base alloy characteristically deteriorates in elasticity. For example, by a test of the Ni-Ti (Ni: 56%) base alloy plate of 1.1 mm thickness, 3.0 mm width, and 150 mm length, it was shown that 60 microns Ni-plating has about one half in elasticity of 10 microns thickness plating.

The soldering heat brings about diffusion bonding to increase the adhesive strength between the Ni-Ti base alloy and Ni-plating. The adhesive strength of Ni or Ni-alloy plating on the Ni-Ti base alloy can be improved by a heating treatment of higher than 250° C. after the plating is made. In the case that the member is fabricated from such Ni-Ti base alloy that deteriorates its characteristics by the treatment of higher than 250° C., no other sections than the portion to be soldered is coated by Ni or Ni-alloy plating.

The Ni or Ni-alloy plating can be executed by either of the wet and dry methods such as electrolytic, chemical, metallizing, spattering and others. For example, the Ni-Ti base alloy wire is coated by Ni or Ni-alloy plating prior to being formed into a member of the frame. The Ni-Ti base alloy member is desirably annealed at a temperature of higher than 600° C. in order to increase the adhesive strength of the Ni or Ni-alloy plating prior to being plated.

The soldering is desirably made by the use of Ag-solder meeting Japanese Industrial Standards in the atmosphere of an inert gas. The soldering is preferably done by the use of resistance heating or by high frequency heating to prevent the other portions, except the portion to be soldered from being inconveniently heated. The heating is desired to be added for a few seconds at a temperature higher than the melting point of the solder but lower than 1000° C. The soldering can be made under a wide range of conditions unless the member is made from such Ni-Ti base alloys that are easy to soften when heated by soldering. In the case of the Ni-Ti base alloy easily softening when heated by soldering, the time of resistance heating should be as short as possible.

Not all the members are required to be fabricated from the Ni-Ti base alloy with a shape-memory effect. In consideration of cost, the rim lock, the hinge, and the like had better to be made from Cu-Ni-Zn or Ni-Cr alloy because they need no superelasticity nor shape-recovering properties. It may be unnecessary to coat these members by Ni or Ni-alloy plating, if fabricated from the easily soldered alloys other than the Ni-Ti base alloy.

The members are assembled to an eyeglass frame unfinished, which is subjected to a shape-memorizing heat-treatment prior to the process of finishing. Thus, the obtained frame of the invention has a superelastic shape-recovering property due to the Ni-Ti base alloy. The bonded portions of the frame between one member made from the Ni-Ti base alloy and the other member made from the same or any other than the Ni-Ti base alloy have a sufficiently great strength. The member to be fabricated from the Ni-Ti base alloy is required to have a superelasticity or shape-memory effect, while it is preferable to be simple in section.

From the foregoing, the eyeglass frame according to the invention not only makes good use of the superelastic or shape-memorizing characteristics of the Ni-Ti base alloy, but also improves the other inconvenient properties of the alloy, such as poor machinability and inferiority in soldering. The member made of the Ni-Ti base alloy is firmly joined with the other member by soldering and is used where its superelasticity is needed, so that the frame of the invention is superior in shape-holding, shape-recovering and fitness to the user's face.

EXAMPLE

Figure 2:
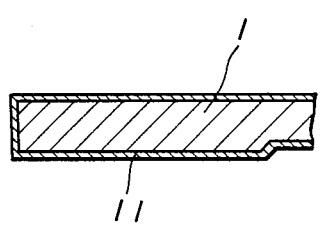
FIGS. 2 and 3 are enlarged sections of each portion of the temple and the hinge to be joined.
Figure 3:
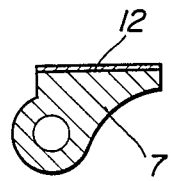

A superelastic Ni-Ti base alloy containing 50.6% of Ni and the balance of Ti is formed into a wire by cold drawing. Then, it is swaged and annealed. The wire is fabricated into a temple by press-working. The temple 1 is sufficiently work-hardened due to the cold-working ratio of 35%. As shown in FIG. 1, the temple 1 has one end connected to a hinge 7 made from Cu-Ni-Zn alloy by soldering. Prior to the soldering, as shown in FIGS. 2 and 3, the temple 1 is coated by dull Ni plating 11 of 10 microns thickness by a method of electrolytic plating while a leaf of Ag-solder(BAg-3 of Japanese Industrial Standards) 12 is disposed on the portion of the hinge 7 which is to be joined with the temple. The Ag-solder is soldered in the atmosphere of argon gas by 1-second resistance-heating with an electric power pulse, and then cooled in the same atmosphere. The temple 1 with the hinge 7 is heated for one hour at 300° C. The adhesive strength between the temple 1 and the hinge 7 is in a range of 18 to 30 kg/sq.mm, which is strong enough for use as a part of an eyeglass frame.

Figure 4:
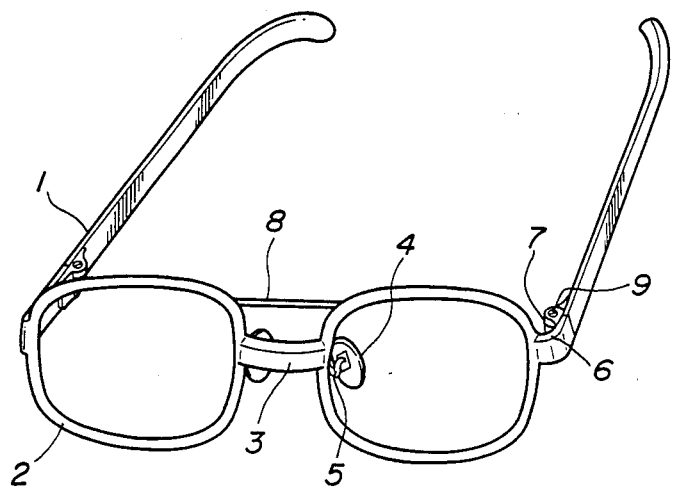
FIG. 4 is a perspective view of the eyeglass frame

As shown in FIG. 4, a pair of temples 1 are attached to the both rim locks 6 of a couple of eyeglass rims 2 made from Cu-Ni-Zn alloy by the use of screws 9, thereby an eyeglass frame being assembled. The coupled rims 2 are previously connected to each other by the intervention of two bridges 3 and 8. The main bridge 3 is provided at the both ends with a couple of pad-holders 5 each holding a pad 4. No other member of the eyeglass frame than the temple 1 contains an alloy with a shape-memory effect.

The straight portion of the temple 7 is tested one hundred times whether it recovers its original shape perfectly by being caused to wind about a round bar of 50 mm in diameter and then released to be free. The test results show the temple always recovers its original shape without reducing the initial elasticity due to the superelastical characteristics of the Ni-Ti base alloy.

While an embodiment of the eyeglass frame of the invention has been illustrated and described, and a method for making the eyeglass frame of the type having a shape-memory effect, it is to be understood that the words used are words of description only and are not intended to limit the scope and range of the invention. It is to be understood that the scope and range of the invention is the fullest measure of that provided by the attached claims.

What is claimed is:

1. An eyeglass frame comprising a bow fabricated from a Ni-Ti base alloy having a shape-memory effect and a hinge fabricated from a material selected from the group consisting of a Cu-Ni-Zn alloy and a Ni-Cr alloy, said bow having a portion soldered to said hinge, said bow portion being coated by a Ni or Ni-alloy plating having a thickness of from about 3 to 50 microns prior to being soldered to said hinge.

2. The eyeglass frame of claim 1, wherein said bow member is fully coated by a Ni or Ni-alloy plating having a thickness of from about 3 to 50 microns.

* * * * *